United States Patent
Bruer et al.

(10) Patent No.: US 7,552,089 B2
(45) Date of Patent: *Jun. 23, 2009

(54) METHOD AND APPARATUS FOR AUTOMATICALLY APPLYING/LINKING TRANSACTIONS IN A FINANCIAL MANAGEMENT SYSTEM

(75) Inventors: Annette M. Bruer, Fargo, ND (US); Kimberly A. Nelson, Fargo, ND (US); William F. Pfingsten, Davenport, ND (US)

(73) Assignee: Microsoft Corporation, Redmond, WA (US)

( * ) Notice: Subject to any disclaimer, the term of this patent is extended or adjusted under 35 U.S.C. 154(b) by 363 days.

This patent is subject to a terminal disclaimer.

(21) Appl. No.: 11/087,459

(22) Filed: Mar. 23, 2005

(65) Prior Publication Data

US 2006/0218083 A1 Sep. 28, 2006

(51) Int. Cl.
*G06Q 40/00* (2006.01)
*G06F 17/00* (2006.01)

(52) U.S. Cl. .................. 705/39; 235/376; 707/100

(58) Field of Classification Search .................. 705/39, 705/22, 23, 29, 34, 35, 41, 40, 30; 235/379, 235/375; 707/100

See application file for complete search history.

(56) References Cited

U.S. PATENT DOCUMENTS

| 5,586,313 | A * | 12/1996 | Schnittker et al. | 235/375 |
| 5,596,642 | A * | 1/1997 | Davis et al. | 705/41 |
| 5,596,643 | A * | 1/1997 | Davis et al. | 705/68 |
| 2003/0158798 | A1 * | 8/2003 | Green | 705/30 |
| 2004/0049452 | A1 * | 3/2004 | Blagg | 705/39 |

OTHER PUBLICATIONS

Bers, Joanna Smith "Cybersapce; The New Promised Land" Jul. 1995, Bank Systems and Technology, V32N7, pp. 32-37.*
Feder, Judith "Excalibur Launches Retrievalwire" Oct. 24, 1995, Business Wire Section 1, p. 1.*
Anonymous, "Industry Briefs" Sep. 1, 1997, EDI News, V11N18, p. 1.*

* cited by examiner

*Primary Examiner*—Kelly Campen
(74) *Attorney, Agent, or Firm*—Alan G. Rego; Westman, Champlin & Kelly P.A.

(57) ABSTRACT

A computer-implemented financial management system that includes a standardized apply system that, in general, allows a user to relatively easily apply any transaction/document to any other transaction/document. The apply system includes a uniform apply interface that is configured to receive at least two generic transactions. The uniform apply interface applies at least a portion of one of the at least two generic transactions to at least a portion of another one of the at least two generic transactions to produce at least one apply record. The at least one apply record is stored in a database.

19 Claims, 8 Drawing Sheets

METHOD AND APPARATUS FOR AUTOMATICALLY APPLYING/LINKING TRANSACTIONS IN A FINANCIAL MANAGEMENT SYSTEM

CROSS REFERENCE TO RELATED APPLICATIONS

Reference is made to co-pending and commonly assigned U.S. patent application Ser. No. 11/087,437, filed Mar. 23, 2005, entitled "METHOD AND APPARATUS FOR APPLYING/LINKING TRANSACTIONS IN A FINANCIAL MANAGEMENT SYSTEM," the content of which is hereby incorporated by reference in its entirety.

BACKGROUND OF THE INVENTION

The present invention generally relates to computerized financial systems. More particularly, the present invention relates to applying/linking transactions in a financial management system.

Computerized financial systems and programs (i.e., software applications) are configured for use by both accountants and non-accountants. These systems allow users to set up various types of accounts such as general ledger, inventory, order entry, accounts receivable, accounts payable, bank manager, and payroll accounts. Each account, or account module, of the accounting system are typically fully integrated and share common data. As a result, a transaction can be entered, for example, as an invoice, and the accounting system automatically performs the necessary credits and debits on the affected accounts including posting the transaction to the general ledger without requiring the user to reenter any data. Thus, such computerized accounting systems are ideal tools for the non-accountant user. Additionally, they save time, reduce the likelihood of errors, and eliminate the need to reenter data for posting to the general ledger.

In addition to providing the above functions, many computerized financial systems include transaction linking or apply systems that allow a user to link certain transactions or documents together. For example, an apply system can be used to link or apply a cash-in receipt to a payment within a particular account module (accounts receivable, accounts payable, etc.). In general, the purpose of the transaction linking process (or apply process) is to reduce the outstanding balances of these transactions/documents so that, eventually, the outstanding balance of the transactions is zero.

In current financial systems, transaction linking is usually cumbersome with limited abilities such as the ability to apply a cash-in receipt to a payment (within a particular account module) as noted in the above example. Further, in current systems, each account module (accounts receivable, accounts payable, etc.) usually has a separate apply system with its own screens, interface, etc. Having a different apply system for each account module, within a single financial system, results in multiple non-standardized apply systems that may differ from each other in appearance and functionality. Such systems are complex, costly and difficult to maintain.

SUMMARY OF THE INVENTION

The present invention relates to a computer-implemented financial management system that includes a standardized apply system that, in general, allows a user to relatively easily apply any transaction/document to any other transaction/document. The apply system includes a uniform apply interface that is configured to receive at least two generic transactions (transactions that have a standardized structure that is not tied to a data schema or structure of any particular account module). The uniform apply interface applies at least a portion of one of the at least two generic transactions to at least a portion of another one of the at least two generic transactions to produce at least one apply record. The at least one apply record is stored in a database.

DETAILED DESCRIPTION OF ILLUSTRATIVE EMBODIMENTS

The present invention relates, in general, to a financial management system that allows for applying/linking of transactions. More specifically, the present invention provides a financial management system that includes a standardized apply system that allows a user to relatively easily apply any transaction/document to any other transaction/document. However, before describing the present invention in greater detail, one illustrative embodiment in which the present invention can be used will be discussed.

Figure 1:
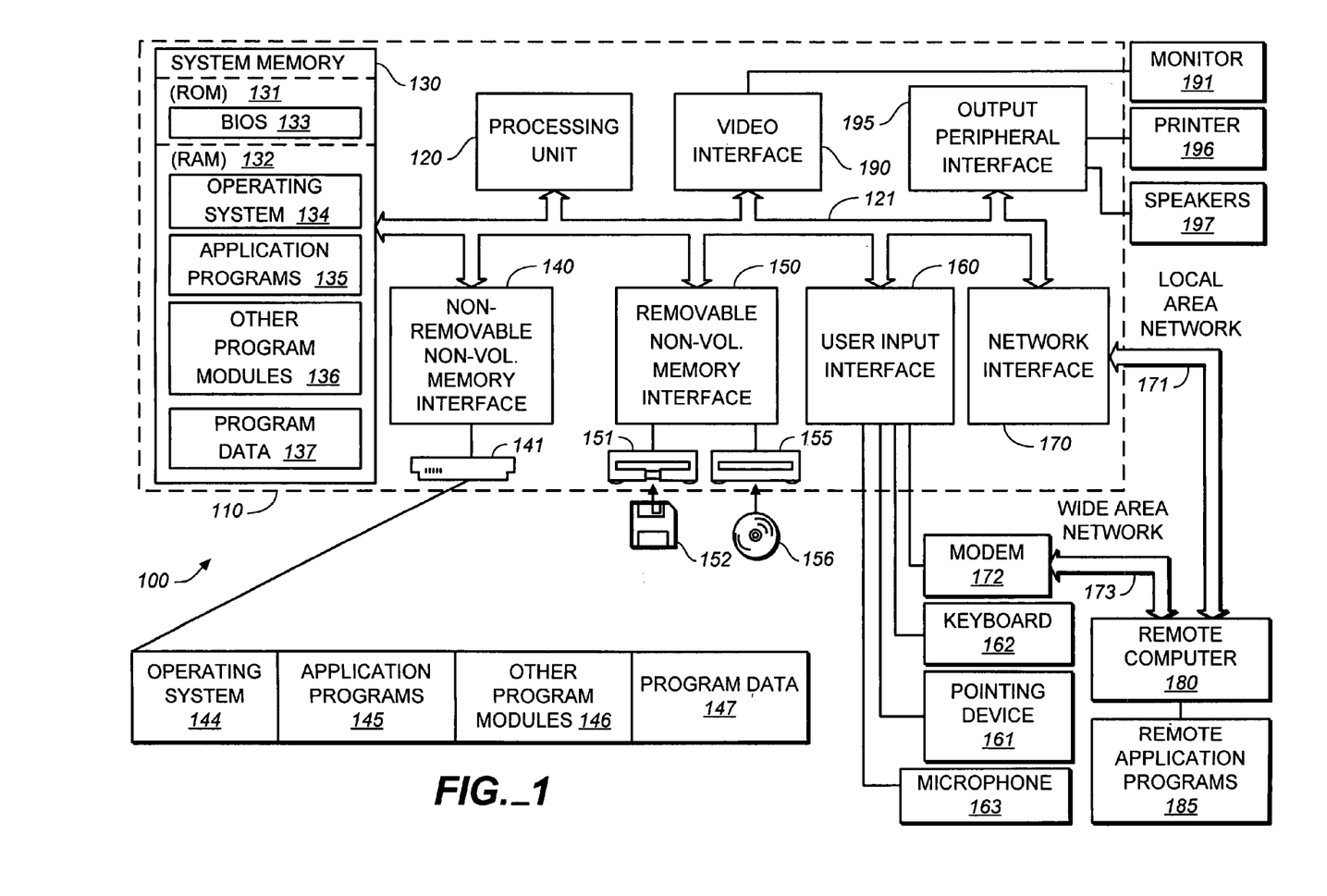
FIG. 1 is a block diagram of one illustrative computing environment in which the present invention can be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
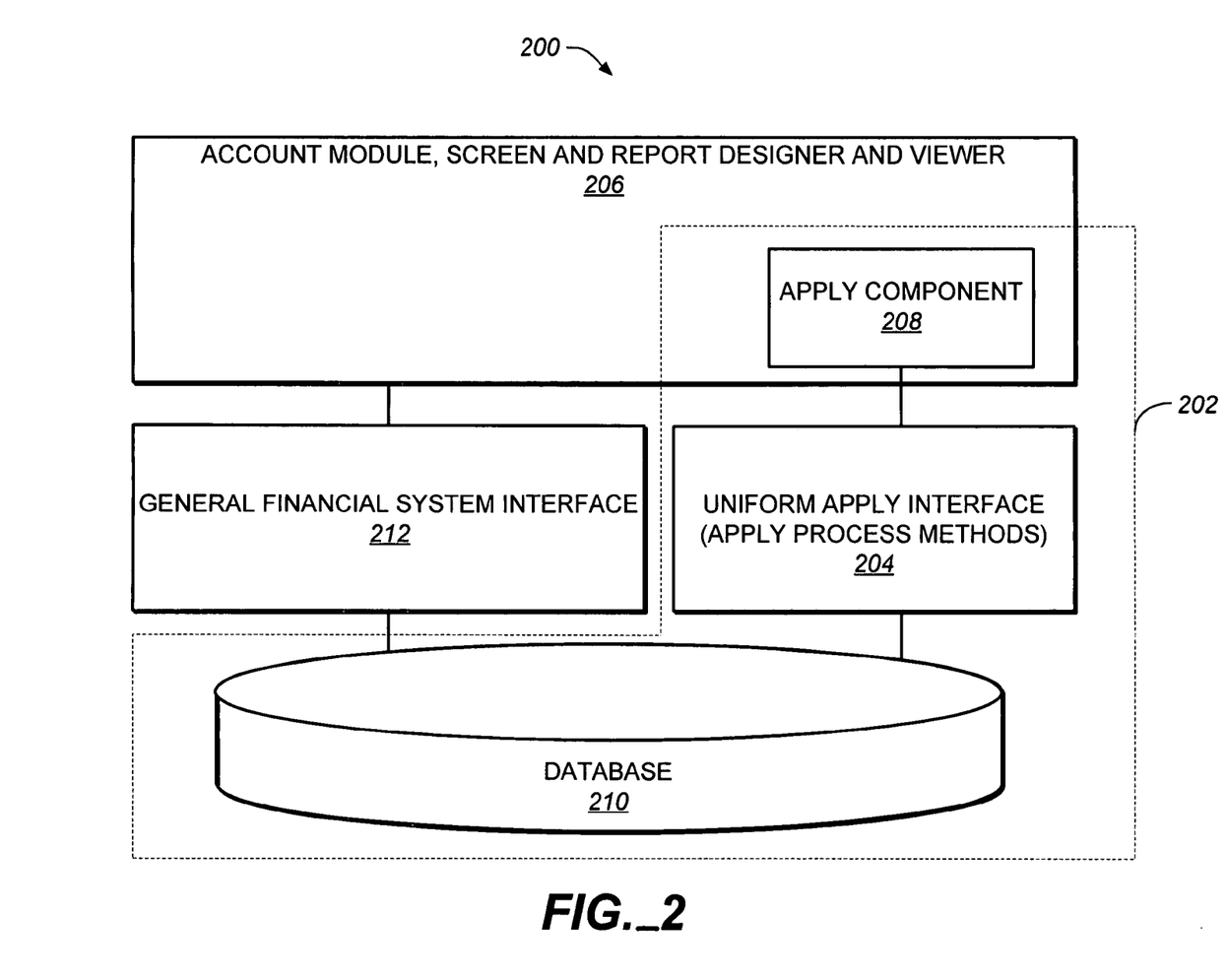
FIG. 2 is a block diagram of a financial management system including an apply system in accordance with an embodiment of the present invention.

FIG. 2 is a simplified block diagram of a financial system 200 that includes an apply system 202 having a uniform apply interface 204 in accordance with an illustrative embodiment of the present invention. System 200 also includes a front-end tool 206, a financial system database 210 and a general financial system interface 212 between front-end tool 206 and financial system database 210.

Front-end tool 206 includes a number of components for designing account modules, screens and reports, and for utilizing the screens for data entry and viewing information. For simplification, only apply component 208 is separately shown in front-end tool 206 of FIG. 2. As mentioned above, an apply process involves matching/linking transactions in a financial management system (such as 200). Apply component 208 serves as a front-end tool of apply system 202 of the present invention. Accordingly, apply component 208 includes screens, a report generator, etc., which help carry out different functions of the apply process of the present invention.

Components of front-end tool 206, other than apply component 208, communicate with database 210 via interface 212. Interface 212, in general, is capable of translating generalized requests, update statements, etc., into database specific query/update statements, which may typically include sequential query language (SQL) statements, that retrieve/update the necessary data stored in database 210. Interface 212 returns any data retrieved from database 210 to front-end tool 206. In this embodiment, instead of interacting with interface 212, apply component 208 interacts with uniform apply interface 204. Details regarding how apply component 208 interacts with uniform apply interface 204 are provided further below.

In accordance with the present invention, uniform apply interface 204 is capable of receiving generic transactions (transactions that have a standardized structure that is not tied to a data schema or structure of any particular account module) from apply component 208, for example. Uniform apply interface 204 links received generic transactions and, as part of the transaction linking process, creates apply records. The apply records are stored in database 210 and can be displayed to a user from screens of apply component 208. The linking of generic transactions, the creation of apply records, etc., are carried out by apply process methods included in uniform apply interface 204. Prior to describing components of apply system 202 in greater detail, a basic example illustrating how the apply process of the present invention is carried out is discussed below in connection with Tables 1 through 4.

This example involves the linking of a sales invoice and a cash-in receipt, each of which has only one line item for 350.00 (in any currency). For clarity, the General Ledger distribution lines (debit and credit entries) that are created when the invoice and the receipt are posted are also shown below. Tables 1 through 4 below illustrate the linking of the example invoice and receipt. The example invoice and receipt records are created and updated as follows:

(1) Invoice #101 is posted. There is only one line for 350.00. General Ledger distributions are as follows:
  Accounts Receivable 350.00
    Sales 350.00

TABLE 1

| Transaction Number | Transaction Amount | Amount Available for Apply | Apply Status | Apply Record(s) |
|---|---|---|---|---|
| Invoice 101 | 350.00 | 350.00 (Invoice 101) | Open | |

(2) Receipt #222 is entered and posted. There is only one line for 350.00. General Ledger distributions are as follows:
  Cash 350.00
    Accounts Receivable 350.00

TABLE 2

| Transaction Number | Transaction Amount | Amount Available for Apply | Apply Status | Apply Record(s) |
|---|---|---|---|---|
| Receipt 222 | 350.00 | 350.00 (Receipt 222) | Open | |

(3) Receipt #222 is applied to Invoice #101. The resulting apply record (#40) is as follows:

TABLE 3

| Apply From Transaction | Apply To Transaction | Discount Available | Apply Amount | Discount Taken | Discount Not Taken |
|---|---|---|---|---|---|
| Receipt 222 | Invoice 101 | 0.00 | 350.00 | 0.00 | 0.00 |

The Invoice and Receipt are updated as follows during the apply process:

TABLE 4

| Transaction Number | Transaction Amount | Amount Available for Apply | Apply Status | Apply Record(s) |
|---|---|---|---|---|
| Invoice 101 | 350.00 | 0.00 [350.00 (Invoice 101) − 350.00 (Receipt 222)] | Closed | Apply 40 |
| Receipt 222 | 350.00 | 0.00 (Receipt 222) | Closed | Apply 40 |

As explained above, uniform apply interface 204 applies the transactions in the above example without taking into consideration the account module(s) (accounts receivable, accounts payable, etc.) to which they belong. The invoice transaction in Table 1 has the same structure as the receipt in Table 2 and therefore the uniform apply interface 204 can carry out the apply process based on the information contained in Tables 1 and 2, which does not include account module information. More detailed examples illustrating different features of the apply process of the present invention are included further below and in Appendix A.

Figure 3:
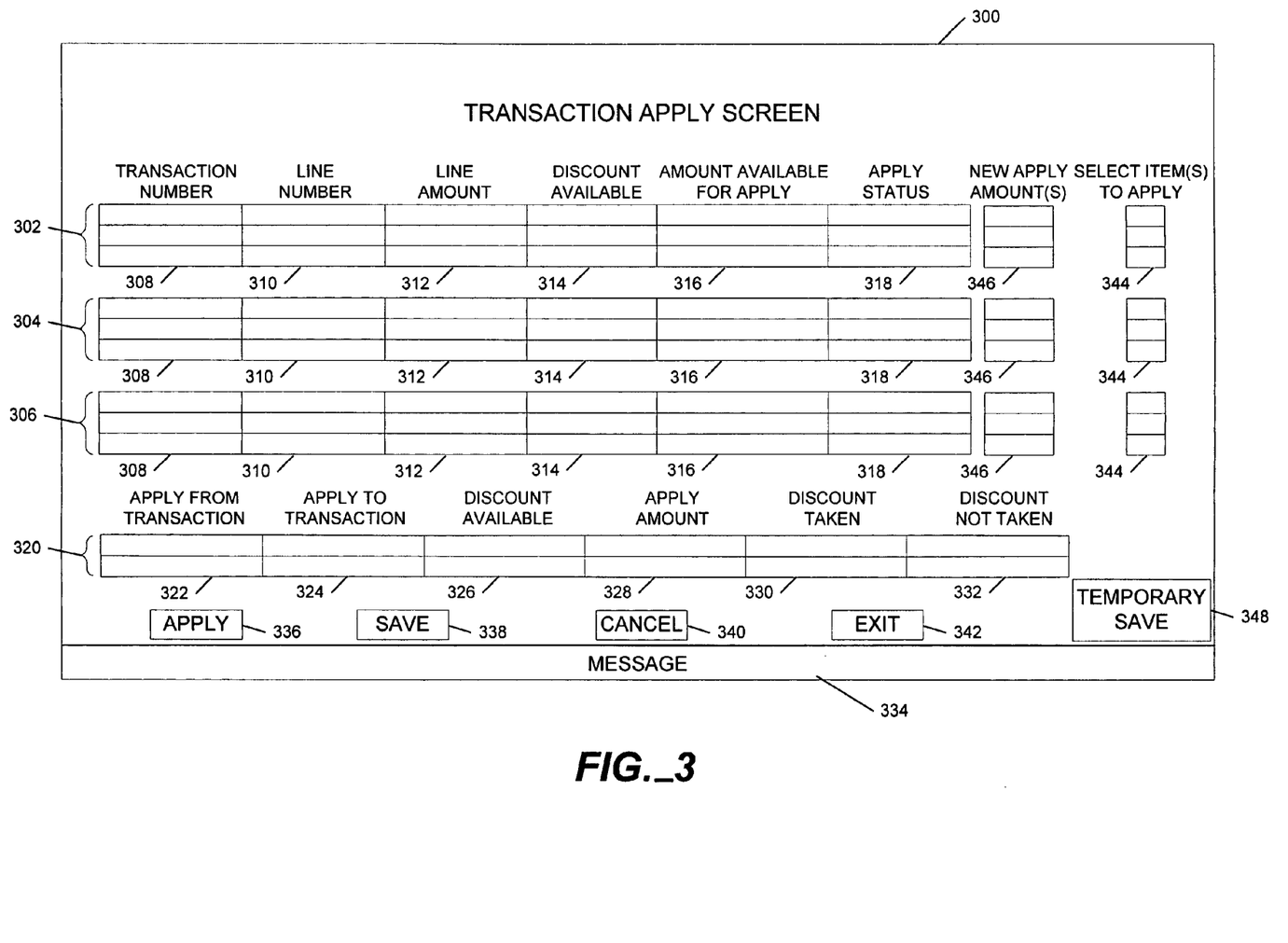
FIG. 3 is a simplified block diagram of an example transaction apply screen, which is a part of an apply system of the present invention.

FIG. 3 is a simplified block diagram of an example transaction apply screen (or user interface) 300, which is a part of apply component 208 of apply system 202 of the present invention. With the help of screen or user interface 300, a user can, in general, apply one transaction to one or more different transactions, resulting in the creation of the apply record.

In FIG. 3, a first portion of transaction apply screen 300 includes transaction blocks 302, 304 and 306, each of which can display multiple line items of a transaction. As can be seen in FIG. 3, each transaction block (302, 304, 306) includes a transaction number field/column 308, a line number field/column 310, a line amount field/column 312, a discount available field/column 314, an amount available for apply field/column 316 and an apply status field/column 318. A second portion 320 of transaction apply screen 300, which displays newly created apply records, includes an apply from transaction field/column 322, an apply to transaction field/column 324, a discount available field/column 326, an apply amount field/column 328, a discount taken field/column 330 and a discount not taken field/column 332. A message field 334 to display errors and other messages is also included. For simplification, a query block in which transaction numbers, for example, can be entered in order to retrieve specific transaction information into transaction blocks 302, 304 and 306 has not been shown.

One of the most basic functions of the present invention, that a user can carry out using screen 300, is to link an invoice having a particular amount with a receipt having the same amount (such as the invoice and receipt shown in Tables 1 and 2 above). The invoice of Table 1 can be retrieved into block 302 and the receipt of Table 2 can be retrieved into block 304, for example. The user can then apply the receipt to the invoice by pointing and clicking on apply button 336, using a mouse, for example. Applying the receipt to the invoice results in an apply record (similar to that shown in Table 3 above) being displayed in portion 320 of screen 300. The user can then complete the apply process by clicking on the save button 338, which will result in the apply record and the updated transactions (shown in Table 4 above) being stored in database 210.

After applying, and prior to saving, the transactions, the user can also opt to cancel the apply by clicking on the cancel button 340. An exit button 342 for closing the screen is also included. In addition to being able to carry out the above basic example, a user can carry out a number of other functions using screen 300.

For instance, if a user wishes to link/apply only certain line items of multi-item transactions, the user can select the desired line items by selecting corresponding fields (in line with the desired item(s)) in the select item(s) to apply column 344. Further, a user can choose to apply less than the entire transaction/item amount by entering new apply amounts in appropriate fields of new apply amount(s) column 346. Also, if a user is unsure whether to finalize a particular apply process involving two or more transactions displayed on screen 300, or if the user would like to complete the apply process at a later time, the user may save the information currently displayed on screen 300 for subsequent finalization by clicking on button 348. The unfinalized records can be saved in a separate table in database 210 or stored in the same table(s) as the finalized records, but with an unfinalized status. The unfinalized records can be automatically displayed to the user for finalization the next time the user selects screen 300 from a menu, for example. The present invention also includes the ability to apply a transaction in one currency to one or more transactions in another currency (or, in general, the ability to apply any currency against any other currency).

One feature of the present invention is the ability to apply or link multiple like (multiple debit or multiple credit) transactions. For example, using screen 300, a finance charge (debit transaction) can be applied to an invoice (debit transaction) to create an applied transaction that represents a higher balance than either the individual invoice or the finance charge balance.

Multiple credit transactions can also be linked in the same manner. For example, consider the case where, every week, a customer purchases goods for $100.00 from a supplier and gives the supplier a check for $100.00. On Friday of this week, the customer notifies the supplier that, in the last set of purchased goods, some of the items were damaged. The supplier decides to refund the customer by issuing a credit memo for $20.00, for example. Thus, the next week, when the customer wants to make a payment for a new set of goods, the customer owes the supplier $80.00 instead of $100.00. However, the $20.00 refund is for the previous set of goods that were paid for in full last week and not for the new set of goods. By allowing for one credit transaction to be applied to other credit transactions, the above situation can be addressed by applying the $20.00 credit memo to a payment of $80.00 to obtain a total of $100.00, which is equal to the current invoice balance. Thus, by providing such a like transaction linking feature, the present invention is capable of more accurately handling complex business transactions than prior apply systems.

The present invention also provides certain apply functions related to General Ledger distribution posting (debit and credit entry posting). An apply example, which involves General Ledger distribution posting, is provided below.

Assume that an invoice for $100.00 is posted on Jan. 1, 2005. The General Ledger distributions are as follows for the invoice (Table 5):

TABLE 5

| Dist Type | Account | Debit | Credit | General Ledger Distribution Remaining Amount |
|---|---|---|---|---|
| Accounts Receivable | 1200 | 100.00 | 0.00 | 100.00 |
| Sales | 4100 | 0.00 | 100.00 | NA |

Assume that a cash payment for $100.00 is received on Jan. 19, 2005 and the following General Ledger distributions are posted (Table 6): (Note that, as shown in Table 6 below, the cash payment is credited to account 1202 instead of being credited to account 1200 to which the invoice was posted.)

TABLE 6

| Dist Type | Account | Debit | Credit |
|---|---|---|---|
| Cash | 1100 | 100.00 | 0.00 |
| Accounts Receivable | 1202 | 0.00 | 100.00 |

The apply process determines whether the receipt credited the correct control account (Accounts Receivable) from the invoice. When the decrease in one account is applied to the increase in the other account and posted, the following information will be posted with the apply record (Table 7):

TABLE 7

| Dist Type | Account | Debit | Credit | General Ledger Distribution Remaining Amount |
|---|---|---|---|---|
| Accounts Receivable | 1202 | 100.00 | 0.00 | 0.00 |
| Accounts Receivable | 1200 | 0.00 | 100.00 | 0.00 |

As can be seen in Table 7 above, the original account 1200 (to which the invoice was posted) is properly reversed, thereby correcting the general ledger. A number of different example functions that apply system 202 of the present invention is capable of carrying out are listed in Appendix A.

Figure 4:
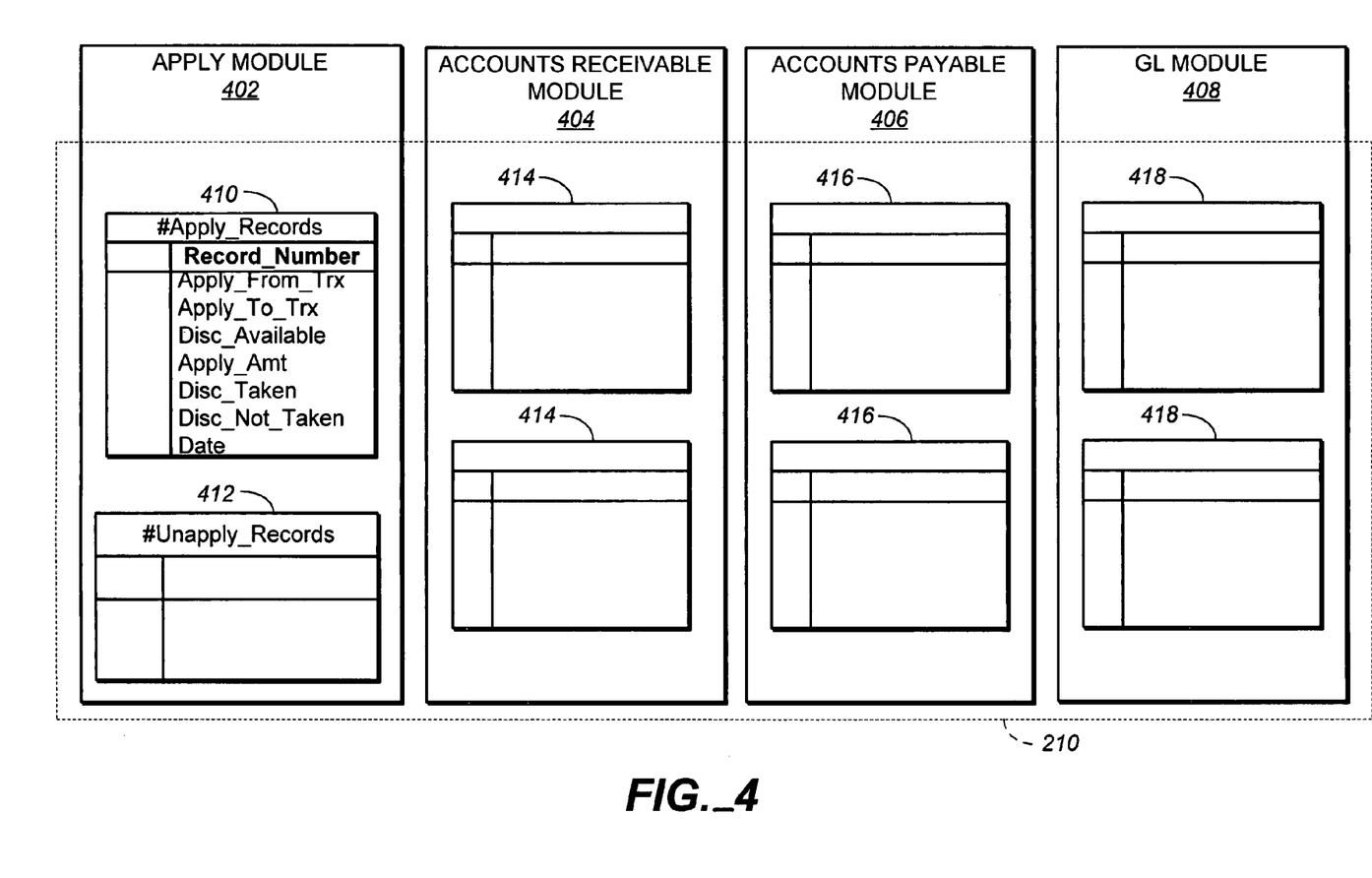
FIG. 4 is a simplified block diagram illustrating how apply records and other transaction information are stored.

As mentioned above, transaction information or transaction records, such as those shown in Tables 1 through 7 above, are stored in a financial system database (such as 210), which typically includes multiple tables for each account module. FIG. 4 is a simplified block diagram illustrating account modules with different tables. Apply records (such as the apply record shown in Table 3) are stored in Apply_Records table 410, which forms a part of apply module 402. Apply module 402 also includes other tables such as Unapply_Records table 412 which includes records created by an unapply process described further below. Accounts receivable module 404 and accounts payable module 406 include tables (414, 416) that store invoice information, receipts, etc., such as the information shown in Tables 1, 2 and 4 above. General ledger (GL) module 408 includes tables 418 that store account codes, transaction distribution lines, etc. Modules (such as 402 through 408) are illustratively fully integrated and share common data. Also, the earlier-described uniform apply interface 204 includes methods capable of accessing/updating the tables shown in FIG. 4 to apply transactions in accordance with the present invention.

Figure 5:
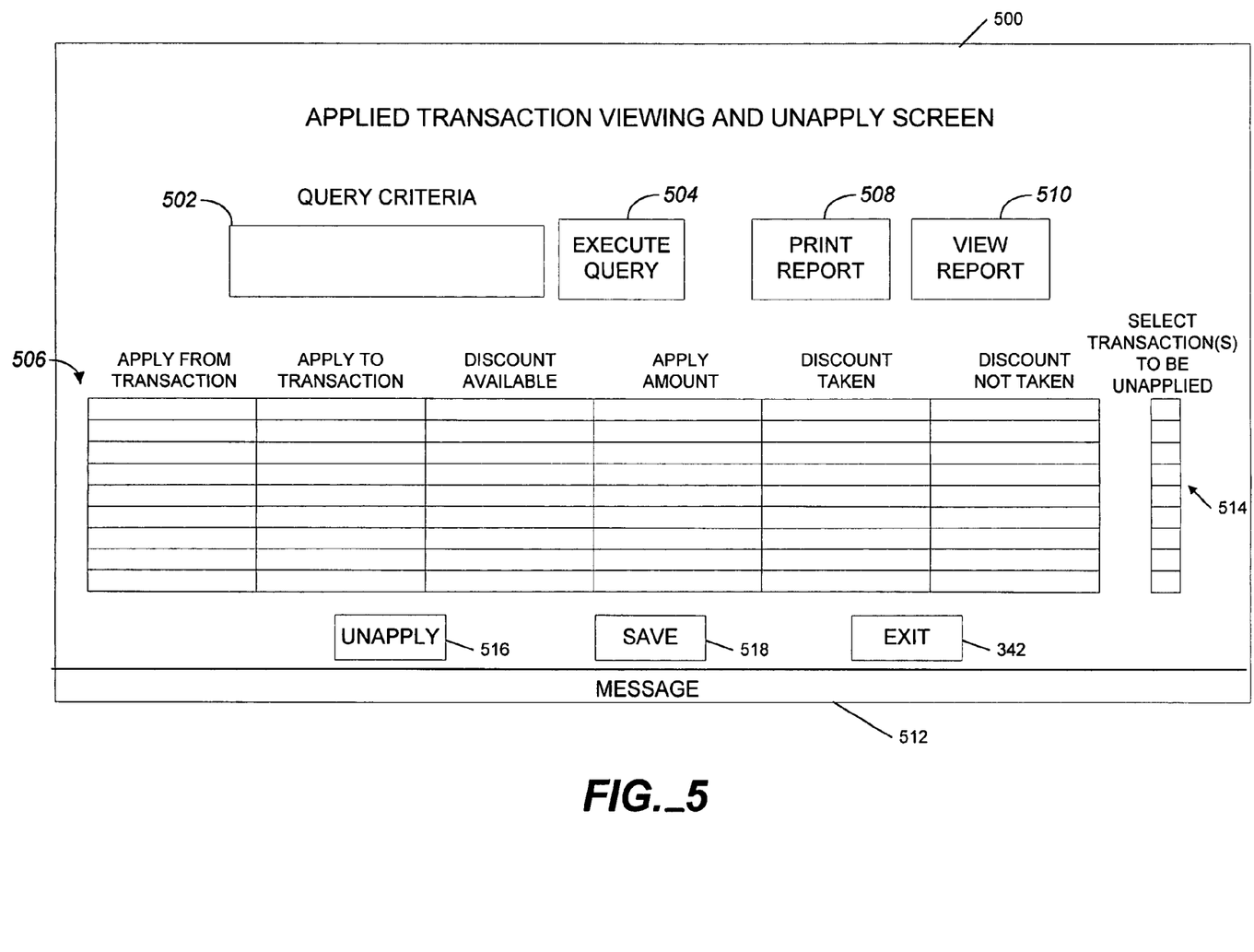
FIG. 5 is a simplified block diagram of an example applied transaction viewing and unapply screen, which is a part of an apply system of the present invention.

FIG. 5 illustrates an example applied transaction viewing and unapply screen 500, which is a part of apply component 208 of apply system 202 of the present invention. With the help of screen or user interface 500, a user can enter query criteria for apply records (in field 502), and point and click on execute query button 504, using a mouse, to retrieve the information requested in the query. The query can include a request for apply records for specific transactions. The retrieved information can be displayed in detail section 506 of the screen and/or written to a file. Reports (based on an entered query) can also be printed or viewed by pointing and clicking on a print report button 508 or a view report button 510. A message field 512 to display errors and other messages is also included.

In embodiments of the present invention, using screen 500, a user can unapply previously applied transactions. After performing a query, the user can select one or more transactions to be unapplied by selecting corresponding fields (in line with the desired item(s)) in the select transactions to be unapplied column 514. Clicking on unapply button 516 results in the selected transactions being unapplied (transaction amounts being adjusted to reflect balances that are indicative of a reversal of the apply). Clicking on save button 518 finalizes the unapply. In embodiments of the present invention, when transactions are unapplied, the apply records of the transactions are not deleted. Instead, new unapply records are created and saved in Unapply_Records table 412 (discussed above in connection with FIG. 4) to reflect that the transactions have been unapplied. By using this method, when transactions are applied during one accounting period and unapplied during a different accounting period, the financial system is capable of providing a user with information regarding these changes that the transactions have undergone.

Figure 6:
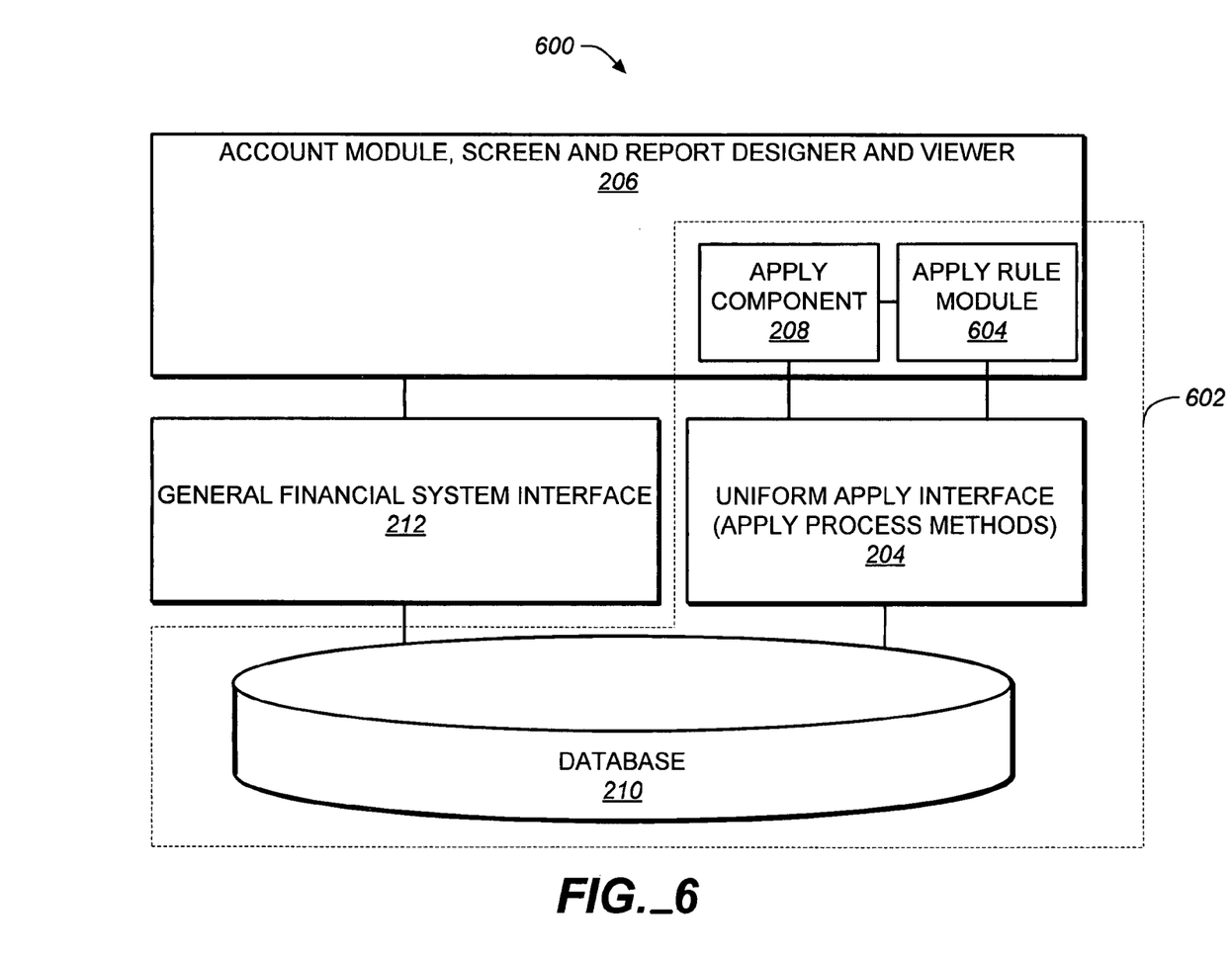
FIG. 6 is a block diagram of a financial management system including an apply system in accordance with an embodiment of the present invention.

The above-described embodiments of the present invention relate to a manual apply process where the user views and manually selects (by clicking on appropriate fields, for example) all transactions that the user wishes to link. However, in embodiments of the present invention, in addition to supporting the manual apply functions described above, the apply system is capable of applying a single transaction that a user selects, for example, to one or more transactions that the system automatically selects. To help carry out such an automatic apply process, embodiments of the apply system of the present invention include apply rules, which define how the apply system should automatically apply transactions when the automatic apply process is triggered. FIG. 6 illustrates such a financial system 600 that includes an apply system 602 that has an apply rules module 604. The remaining components of financial system 600 are similar to the components of financial system 200 (FIG. 2) and are therefore represented by the same reference numerals. Apply rules module 604 includes screens to define, view and update apply rules, and methods, which work in conjunction with methods of uniform apply interface 204 to help ensure that the automatic apply process operates in a manner defined by the apply rules.

Figure 7:
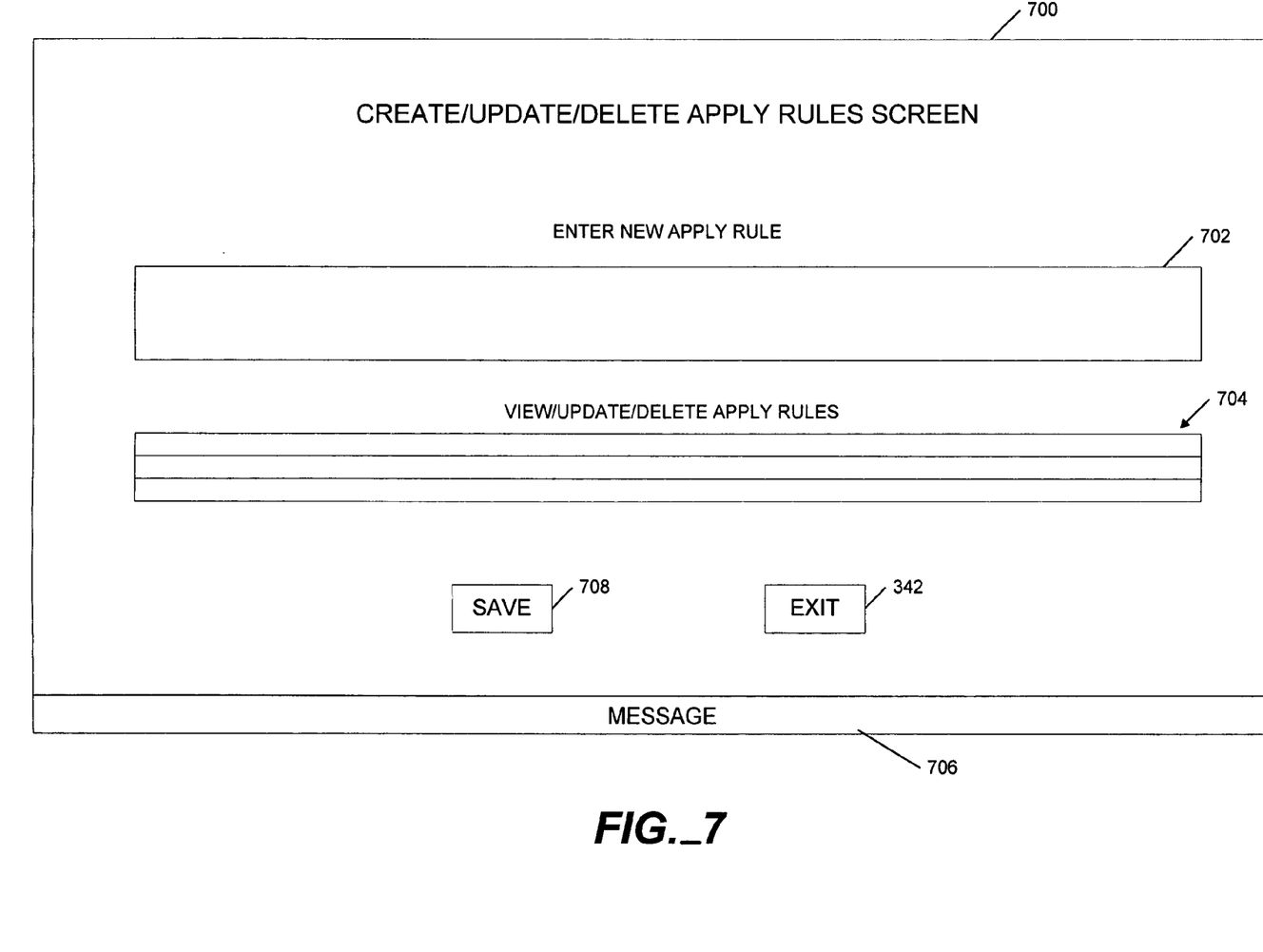
FIG. 7 is a simplified block diagram of an example create/update/delete apply rule screen, which is a part of an apply system of the present invention.

FIG. 7 illustrates an example create/update/delete apply rules screen 700, which is a part of apply rules module 604 of apply system 602 of the present invention. Screen or user interface 700 includes an enter new apply rules section 702 and a view/update/delete apply rules section 704. A message field 706 to display errors and other messages is also included. For simplification, a query block in which query criteria can be entered in order to retrieve specific apply rules into block/section 704 has not been shown.

In section 702, a user can define a new apply rule for inclusion into apply system 602. A simple example of an apply rule is "apply to the oldest available transaction" (based on transaction date). For simplification, enter new apply rule section 702 is shown as a single field. However, section 702 can include a number of fields, some of which can have pop-up lists of predefined options/values (value constraints) from which the user can select the desired value(s) to build a new apply rule. Some example apply rule fields are listed further below in Table 8.

In section 704, a user can retrieve stored apply rules and, if desired, modify/delete one or more of the existing apply rules. New and modified apply rules can be saved to database 210 by clicking on save button 708.

Figure 8:
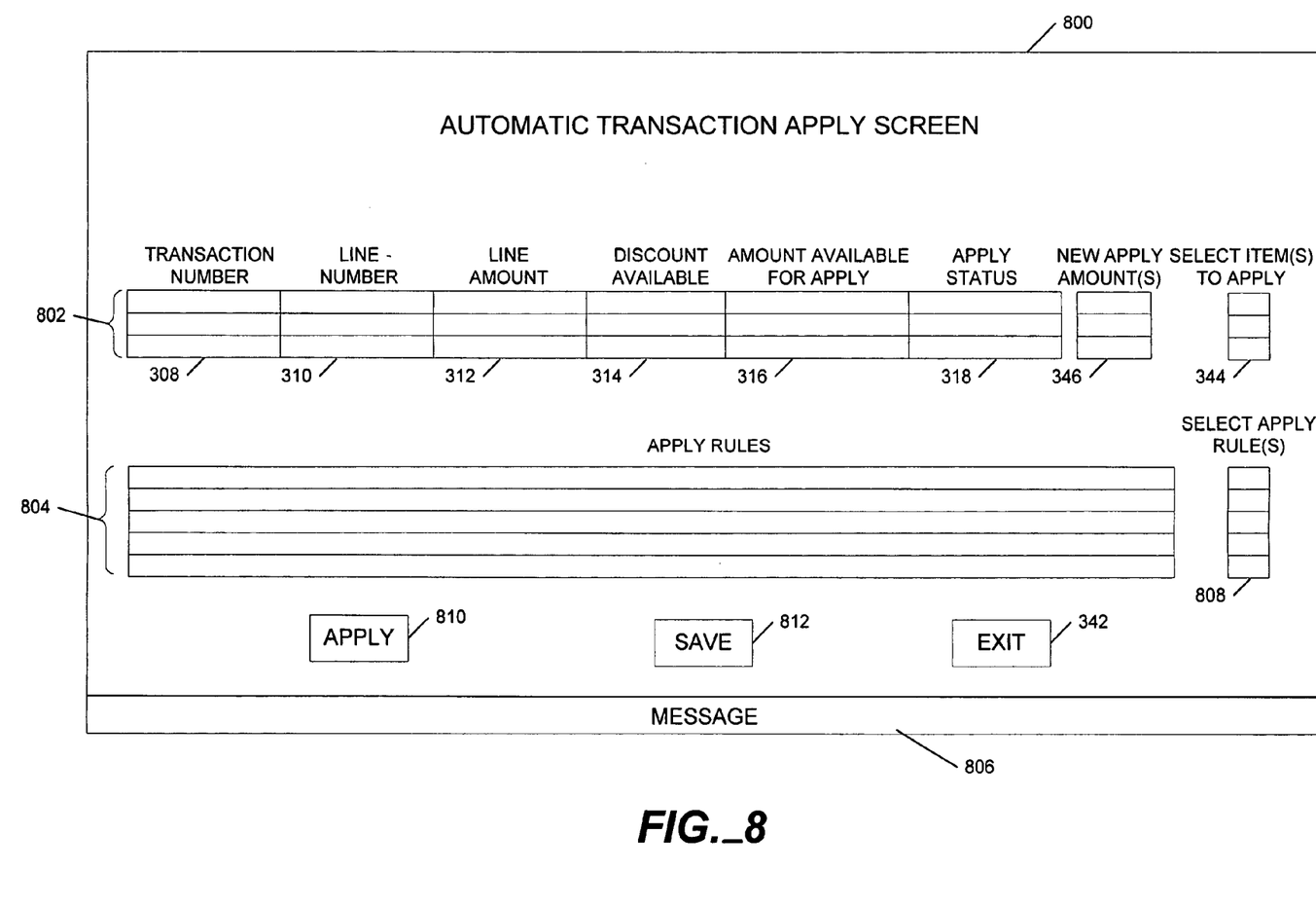
FIG. 8 is a simplified block diagram of an example automatic transaction apply screen, which is a part of an apply system of the present invention.

FIG. 8 is a simplified block diagram of an example automatic transaction apply screen 800, which is a part of apply rules module 604 of apply system 602 of the present invention. With the help of screen or user interface 800, a user can, in general, retrieve/select a transaction and direct apply system 602 to automatically apply the selected transaction to one or more stored transactions.

In FIG. 8, a first portion of automatic transaction apply screen 800 includes a transaction block 802, which can display multiple line items of a transaction. Columns/fields of transaction block 802 are substantially similar to the columns/fields of transaction block 302 of screen 300 (FIG. 3) and are therefore represented by the same reference numerals. Further, the new apply amount(s) and select item(s) to apply columns are also the same as those shown in screen 300. A transaction is retrieved into block 802 in a manner described earlier in connection with the previously described screens. A second portion/block 804, of automatic transaction apply screen 800, displays apply rules saved in database 210. A message field 806 to display errors and other messages is also included.

To carry out an automatic apply using screen 800, a user retrieves a desired transaction into block 802 and selects one or more apply rules by selecting corresponding fields (in line with the desired rule(s)) in the select apply rules column 808. Of course, the user will not be able to select multiple rules that contradict each other. For example, the user cannot select an "apply to oldest transaction(s)" rule and an "apply to most recent transaction(s)" rule at the same time. The selected rule(s) define how the transaction displayed in block 802 will be automatically applied to one or more other transactions in database 210. Clicking on apply button 810 triggers the automatic apply. After an "Apply Completed" message, for example, is displayed on message line 806, the automatic apply can be finalized by clicking on save button 812. Specific items of a transaction can be selected, and new apply amounts can be entered, using the select item(s) to apply column 344 and the new apply amount(s) column 346 in a manner described earlier in connection with FIG. 3

Apply system 602 can include a list of "predefined" apply rules and, as mentioned above, a user can add new apply rules using screen 700, for example. In embodiments of the present invention, a user can define multiple transaction-matching levels (three example levels are shown in Table 8 included further below) and also define which fields to match, between the transactions that are being applied, for each level. Transaction matching options are defined differently for each level. If a match is not obtained at one level, the system tries to match transactions at a next level.

In some embodiments of the present invention, a user can create transaction profiles (multiple versions of a transaction type) and define different rules for different transaction profiles. For example, for an invoice transaction type, a user can create transaction profiles such as a standard invoice profile, a web invoice profile, a phone invoice profile, etc. Each of the profiles are customized, and can be utilized in apply rules in order to properly direct payments to particular categories of invoices, such that certain promotions, for example, can be taken advantage of and, in general, the transactions can be matched in a manner that minimizes costs.

In embodiments of the present invention, write-off rules can be defined. Specifically, a user can define whether apply system 602 should automatically create write-off transactions if an underpayment or an overpayment is within a tolerance level (which the user can also define). For example, if a payment of $10.00 is applied to an invoice having a balance of $10.50 and the defined tolerance is $1.00, the system will automatically write-off the invoice after the $10.00 payment is applied. A user can also define which transaction profile to use when creating a write-off transaction.

Embodiments of the present invention also allow for rules that apply across National Accounts to be defined. A National Account defines relationships between constituents in a financial system. For example, parent-child relationships can be defined for multiple customers in a financial system. Example apply rule fields that relate to National Accounts are included further below in Table 8.

In embodiments of the present invention, rules that dictate how General Ledger distributions are split on a partial apply can also be defined. For example, consider a $100.00 invoice that is split into three different Accounts Receivable accounts at the time the invoice is entered, with $20.00 being assigned to the first AR account, $30.00 being assigned to the second AR account and the remaining $50.00 being assigned to the third AR account. If a check is received for $60.00, for example, the apply system allows a user to define how the $60.00 can be applied to the above three General Ledger distribution lines of the $100.00 invoice. The user can choose to evenly apply the $60.00 payment (such that $20.00 will be applied to each General Ledger distribution line) or choose to apply different payment amounts to each General Ledger distribution line. A number of different apply rules that can be defined in apply system 602 of the present invention are included in Appendix A.

To define the apply rules explained above, apply system 602 includes a number of predefined fields, which can be included in one or more tables of database 210. Table 8 below lists some example predefined apply rule fields.

TABLE 8

| Fields | Data Type | Value Constraints | Initial Value/ Subsequent Value |
|---|---|---|---|
| Automatically Post the Apply | Boolean | Yes No | Yes/NA |
| Always Take Expired Discounts | Boolean | Yes No | No/NA |
| Apply Across Companies | Boolean | Yes No | No/NA |
| Apply Based On | Single List | Match Specific Fields Transaction Type Transaction Date Due Date Discount Date | Match Specific Fields/NA |
| Apply Rule Description | String | No Constraints | Blank/NA |
| Apply To | Single List | Whole Transaction Individual Lines | Whole Transaction/ NA |
| Apply to National Account | Boolean | Yes No | No/NA |
| Attachments | Association | Zero or Many AOF | Blank/NA |
| Automatic Write-off in AP | Boolean | Yes No | No/NA |
| Automatic Write-off in AR | Boolean | Yes No | No/NA |
| Created Date | Date | No Constraints | Blank/NA |
| Created User ID | Short ID | No Constraints | Blank/NA |
| Date Order to Apply | Single List | Due Date Transaction Date Discount Date | Due Date/ NA |
| Enterprise Organization Structure (Company Group) | Single List | Available Companies Enterprise = NA Company Group = One | Current Company/ NA |
| If No Match Found | Single List | Apply to Oldest Due Date | Apply to Oldest Due Date/NA |

TABLE 8-continued

| Fields | Data Type | Value Constraints | Initial Value/ Subsequent Value |
|---|---|---|---|
| | | Apply to Oldest Transaction Date Apply by Discount Date Apply to First Transaction Number Apply to First Invoice Number Do Not Apply | |
| Last Modified Date | Date | No Constraints | Blank/NA |
| Last Modified User ID | String ID | No Constraints | Blank/NA |
| Line Apply Amount | Single List | Apply in Line Order Apply Evenly Across Lines Prorate Across Lines | Apply in Line Order/ NA |
| Line Type Apply Order | Multiple List | Line Item Amount Tax Amount Freight Amount Fee Amount | Blank/NA |
| National Account Child Transaction | Single List | Apply to Child first, then to Parent, then to National Account Apply to Child first, then to National Account Apply to Parent first, then to Child, then to National Account Apply to Parent first, then to National Account Apply to National Account Apply Only to Child | Apply to Child first, then to National Account/ NA |
| National Account Parent Transaction | Single List | Apply to Parent first, then to Children Apply to National Account Apply Only to Parent | Apply to Parent first, then to Children/ NA |
| Specific Fields (Level 1) | Multiple List | Reference Number Customer/ Supplier ID Customer/ Supplier Name Invoice Number Purchase Order Number Order Number Check Number Amount | Customer/ Supplier ID, Invoice Number, Amount/NA |
| Specific Fields (Level 2) | Multiple List | Reference Number Customer/ Supplier ID Customer/ Supplier Name Invoice Number Purchase Order Number Order Number Check Number Amount | Customer/ Supplier ID, Invoice Number/NA |
| Specific Fields (Level 3) | Multiple List | Reference Number Customer/ Supplier ID Customer/ Supplier Name Invoice Number Purchase Order Number Order Number Check Number Amount | Customer/ Supplier ID/ NA |

It should be noted that, in the above-described embodiments, only user interfaces are shown for initiating/triggering the apply process. However, in accordance with the present invention, generic transactions can be received by uniform apply interface 204 from a process that initiates/triggers the transaction linking without human intervention. A batch job can be scheduled to initiate/trigger transaction linking at a predetermined time. The above-described embodiments are only some examples of how the present invention can be carried out.

Although the present invention has been described with reference to particular embodiments, workers skilled in the art will recognize that changes may be made in form and detail without departing from the spirit and scope of the invention.

What is claimed is:
1. A financial system comprising:
    a uniform apply interface configured to receive a generic transaction, and to automatically apply, independently of any account that may be associated with the generic transaction, by linking the generic transaction to at least one of a plurality of other transactions in the financial system to produce at least one apply record; and a database configured to store the at least one apply record, wherein the generic transaction has a standardized structure that is not tied to a data schema or structure of any particular account module, wherein, after receiving the generic transaction and prior to carrying out the automatic apply, the uniform apply interface is configured to determine, based on at least one apply rule, which of the plurality of other transactions in the financial system is suitable for automatically applying to the generic transaction.

2. The system of claim 1 wherein the financial system further comprises a first user interface through which a user can select the generic transaction.

3. The system of claim 2 wherein the first user interface is further configured to allow a user to select the at least one apply rule, from a plurality of apply rules, for use in determining which of the plurality of other transactions in the financial system is suitable for automatically applying to the generic transaction.

4. The system of claim 3 wherein the financial system further comprises a second user interface for defining apply rules.

5. The system of claim 3 wherein at least some of the plurality of apply rules are predefined in the financial system.

6. The system of claim 3 wherein at least some of the plurality of apply rules are defined to allow for multiple levels of transaction matching criteria to be utilized in determining which of the plurality of other transactions, in the financial system, is suitable for automatically applying to the generic transaction.

7. The system of claim 3 wherein the plurality of apply rules comprise at least one write-off rule, which defines a tolerance level within which imperfectly matched transactions are written-off in the financial system.

8. The system of claim 3 wherein the plurality of apply rules comprise at least one national-account rule that defines transaction-matching criteria in terms of parent-child relationships between constituents in the financial system.

9. The system of claim 3 wherein the plurality of apply rules comprise at least one balance splitting rule, which defines how a balance of the generic transaction is distributed amongst multiple other transactions.

10. A computer-implemented method of linking transactions in a financial system, comprising:

receiving, in an apply interface, a generic transaction, the generic transaction having a standardized structure that is not tied to a data schema or structure of any particular account module;

automatically linking, independently of any account that may be associated with the generic transaction, the generic transaction, within the apply interface, to at least one of a plurality of other transactions in the financial system; and storing the linked generic transaction and the at least one of the plurality of the other transactions.

11. The method of claim 10 wherein automatically linking the generic transaction to at least one of a plurality of other transactions comprises creating and storing at least one apply record that reflects consolidated outstanding balances of the linked transactions.

12. The method of claim 10 and further comprising determining, based on at least one apply rule, which of the plurality of other transactions in the financial system is suitable for automatically linking to the generic transaction.

13. The method of claim 10 and further comprising selecting the generic transaction using a first user interface.

14. The method of claim 13 and further comprising utilizing the first user interface to select the at least one apply rule, from a plurality of apply rules, for use in determining which of the plurality of other transactions in the financial system is suitable for automatically linking to the generic transaction.

15. The method of claim 14 and further comprising utilizing a second user interface for defining apply rules.

16. The method of claim 14 wherein at least some of the plurality of apply rules are predefined in the financial system.

17. The method of claim 14 wherein at least some of the plurality of apply rules are defined to allow for multiple levels of transaction matching criteria to be utilized in determining which of the plurality of other transactions, in the financial system, is suitable for automatically applying to the generic transaction.

18. The method of claim 14 wherein the plurality of apply rules comprise at least one write-off rule, which defines a tolerance level within which imperfectly matched transactions are written-off in the financial system.

19. The method of claim 14 wherein the plurality of apply rules comprise at least one national-account rule that defines transaction-matching criteria in terms of parent-child relationships between constituents in the financial system.

* * * * *